(12) United States Patent
Cornwell et al.

(10) Patent No.: US 7,793,059 B2
(45) Date of Patent: Sep. 7, 2010

(54) INTERLEAVING POLICIES FOR FLASH MEMORY

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 912 days.

(21) Appl. No.: 11/334,293

(22) Filed: Jan. 18, 2006

(65) Prior Publication Data

US 2007/0168625 A1    Jul. 19, 2007

(51) Int. Cl.
*G06F 12/00* (2006.01)
*G06F 13/00* (2006.01)
*G06F 13/28* (2006.01)

(52) U.S. Cl. ............................. 711/157; 711/E12.079

(58) Field of Classification Search ............... 711/157, 711/103
See application file for complete search history.

(56) References Cited

U.S. PATENT DOCUMENTS

| | | | |
|---|---|---|---|
| 5,341,489 A | | 8/1994 | Heiberger et al. |
| 5,404,543 A | * | 4/1995 | Faucher et al. ............. 713/323 |
| 5,473,753 A | | 12/1995 | Wells et al. |
| 5,577,194 A | | 11/1996 | Wells et al. |
| 5,592,641 A | | 1/1997 | Fandrich et al. |
| 5,602,987 A | | 2/1997 | Harari et al. |
| 5,621,685 A | | 4/1997 | Cernea et al. |
| 5,671,229 A | | 9/1997 | Harari et al. |
| 5,719,808 A | | 2/1998 | Harari et al. |
| 5,848,009 A | | 12/1998 | Lee et al. |
| 5,880,996 A | | 3/1999 | Roohparvar |
| 5,903,914 A | * | 5/1999 | Zulian ...................... 711/163 |
| 5,978,569 A | * | 11/1999 | Traeger .................... 709/244 |
| 6,014,755 A | | 1/2000 | Wells et al. |
| 6,052,306 A | | 4/2000 | Sedlak et al. |
| 6,094,693 A | | 7/2000 | Haneda |
| 6,148,435 A | | 11/2000 | Bettman |
| 6,149,316 A | | 11/2000 | Harari et al. |
| 6,269,025 B1 | | 7/2001 | Hollmer et al. |
| 6,304,487 B1 | | 10/2001 | Pawletko et al. |
| 6,333,889 B1 | * | 12/2001 | Arimoto ............... 365/230.03 |

(Continued)

FOREIGN PATENT DOCUMENTS

EP        0 629 952        12/1994

(Continued)

OTHER PUBLICATIONS

K9XXG08UXM—Preliminary Flash Memory—Samsung Electronics, pp. 1-44.

(Continued)

*Primary Examiner*—Sheng-Jen Tsai
(74) *Attorney, Agent, or Firm*—Fish & Richardson P.C.

(57) ABSTRACT

Articles and associated methods and systems relate to selecting read interleaving policies independently of selecting write interleaving policies. In various implementations, the selection may be static or dynamic during operation. In implementations that dynamically select read interleaving policies and write interleaving policies, the selection may be based on various operating conditions, such as temperature, power source, battery voltage, and operating mode. Examples of operating modes may include (1) reading or writing to flash memory when connected to an external power source, (2) reading from flash memory when powered by portable power source (e.g., battery), and (3) writing to flash memory when powered by a portable power source.

24 Claims, 3 Drawing Sheets

U.S. PATENT DOCUMENTS

| | | |
|---|---|---|
| 6,426,893 B1 | 7/2002 | Conley et al. |
| 6,516,381 B1 | 2/2003 | Hamilton et al. |
| 6,721,820 B2 | 4/2004 | Zilberman et al. |
| 6,748,562 B1 | 6/2004 | Krech, Jr. et al. |
| 6,757,842 B2 | 6/2004 | Harari et al. |
| 6,763,424 B2 | 7/2004 | Conley |
| 6,904,506 B2 | 6/2005 | Wu et al. |
| 6,914,846 B2 | 7/2005 | Harari et al. |
| 6,947,332 B2 | 9/2005 | Wallace et al. |
| 6,956,769 B2 | 10/2005 | Lee |
| 7,127,622 B2 | 10/2006 | Schnepper |
| 7,137,011 B1 | 11/2006 | Harari et al. |
| 7,162,569 B2 | 1/2007 | Conley et al. |
| 7,237,046 B2 | 6/2007 | Paley et al. |
| 7,237,074 B2 | 6/2007 | Guterman et al. |
| 7,240,219 B2 | 7/2007 | Teicher et al. |
| 7,278,038 B2 | 10/2007 | Schnepper |
| 7,304,891 B2 | 12/2007 | Kim |
| 2001/0014049 A1 | 8/2001 | Woo et al. |
| 2003/0021157 A1 | 1/2003 | Matsubara et al. |
| 2004/0085818 A1* | 5/2004 | Lynch et al. ........... 365/189.02 |
| 2004/0172576 A1 | 9/2004 | Yoshii et al. |
| 2004/0174763 A1 | 9/2004 | Schnepper |
| 2005/0140685 A1 | 6/2005 | Garg |
| 2005/0144361 A1* | 6/2005 | Gonzalez et al. ............ 711/103 |
| 2005/0188230 A1 | 8/2005 | Bilak |
| 2006/0126415 A1 | 6/2006 | Matarrese et al. |
| 2006/0142977 A1 | 6/2006 | Oh et al. |
| 2006/0203556 A1 | 9/2006 | Chen et al. |
| 2007/0008801 A1 | 1/2007 | Chiang et al. |
| 2007/0055821 A1 | 3/2007 | Ootsuka et al. |
| 2009/0196100 A1* | 8/2009 | Merry et al. ........... 365/185.04 |

FOREIGN PATENT DOCUMENTS

| | | |
|---|---|---|
| JP | 10-187302 | 7/1998 |
| JP | 2003-036205 | 2/2003 |
| JP | 2003-308138 | 10/2003 |
| JP | 2005-135350 | 5/2005 |
| WO | 98/15149 | 9/1998 |
| WO | WO 03/081407 | 10/2003 |

OTHER PUBLICATIONS

"Common Flash Memory Interface Specification," Release 2.0, Dec. 1, 2001; pp. 1-25.

"17.3 RAID0-Striping," by T. Rhodes and M. Stokely; FreeBSD Handbook, Chpt 17 GEOM: Modular Disk Transformation Framework; pp. 1-3.

"Two Technologies Compared: NOR vs. NAND White Paper," Jul. 3, 91-SR-012-04-8L, Rev 1.1, pp. 1-14.

"ATA Flash Disk Controller," 2004 Silicon Storage Technology, Inc.; pp. 1-76.

"512M×8 Bit / 1G×8 Bit NAND Flash Memory," Flash Memory, Samsung Electronics, pp. 1-38.

"RAID," SearchWinSystems.Com Learning Guide: Backup Solutions, pp. 1-3.

"Advanced Technology Attachment," http://foldoc.doc.ic.ac.uk/foldoc.

"Portalplayer, Inc.—Products," http://www.portalplayer.com/products/index.html, pp. 1-5.

Office Action received in Chinese application 200710002279.7, mailed Mar. 28, 2008, 10 pages.

Office Action received in U.S. Appl. No. 11/339,750, mailed May 23, 2008, 16 pages.

Office Action received in EP Application No. 07000695.2, mailed Jun. 9, 2008, 2 pages.

Office Action received in CN Application No. 200710002279.7, mailed Sep. 12, 2008, 5 pages.

European Search Report mailed Sep. 6, 2007, for EP Application No. 07000695.2.

* cited by examiner

INTERLEAVING POLICIES FOR FLASH MEMORY

TECHNICAL FIELD

Various implementations may relate generally to accessing memory, and particular implementations may relate to methods and systems for interleaving policies for accessing memory.

BACKGROUND

As computing devices have increased in capabilities and features, demand for data storage devices has grown. Data storage devices have been used, for example, to store program instructions (i.e., code) that may be executed by processors. Data storage devices have also been used to store other types of data, including audio, image, and/or text information, for example. Recently, systems with data storage devices capable of storing substantial data content (e.g., songs, music videos, etc. . . . ) have become widely available in portable devices.

Such portable devices include data storage devices that have small form factors and are capable of operating from portable power sources, such as batteries. Some data storage devices in portable devices may provide non-volatile memory that is capable of retaining data when disconnected from the power source. Portable devices have used various non-volatile data storage devices, such as hard disc drives, EEPROM (electrically erasable programmable read only memory), and flash memory.

Flash memory has become a widely used type of semiconductor memory. Flash memory may provide a non-volatile memory in portable electronic devices and consumer applications, for example.

Two types of flash memory are NOR flash and NAND flash. In general, NOR flash may differ from NAND flash in certain respects. For example, NOR flash typically provides the capacity to execute code in place, and is randomly accessible (i.e., like a RAM). For example, NOR flash may provide code storage and direct execution in portable electronics devices, cell phones, and PDAs.

In comparison, NAND flash can typically erase data more quickly, access data in bursts (e.g., 512 byte chunks), and may provide more lifetime erase cycles than comparable NOR flash. NAND flash may generally provide non-volatile storage at a low cost per bit as a high-density file storage medium for consumer devices, such as digital cameras and MP3 players, for example. NAND flash may also be used for applications such as data storage in camera cell phones.

In some data storage systems, memory accesses may be interleaved across multiple memory locations. In RAID-0 type systems, for example, data are split up into N blocks that are written to or read from N memory locations at the same time. Instead of having to wait on the system to write 8 k to one memory location, an interleaved system can simultaneously write blocks of 2 k to each of four different memory locations.

SUMMARY

In various implementations, articles and associated methods and systems relate to selecting read interleaving policies independently of selecting write interleaving policies. In various implementations, the selections may be static or dynamic during operation. In implementations that dynamically select read interleaving policies and write interleaving policies, the selection may be based on various operating conditions, such as temperature, power source, battery voltage, and operating mode. Examples of operating modes may include (1) reading or writing to flash memory when connected to an external power source, (2) reading from flash memory when powered by portable power source (e.g., battery), and (3) writing to flash memory when powered by a portable power source.

Some implementations may provide one or more advantages. For example, battery life may be extended for portable power applications. Read and write interleaving policies may be set or selected independently to achieve a desired performance to minimize memory access times with acceptable electrical power consumption (e.g., peak current) characteristics. The selection of read and write interleaving policies may be adapted according to various operating conditions. Some implementations may dynamically select between reducing access times and minimizing peak currents, for example, based on the operating conditions, such as temperature information, power source availability, battery voltage, and/or operating mode.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

Figure 1:
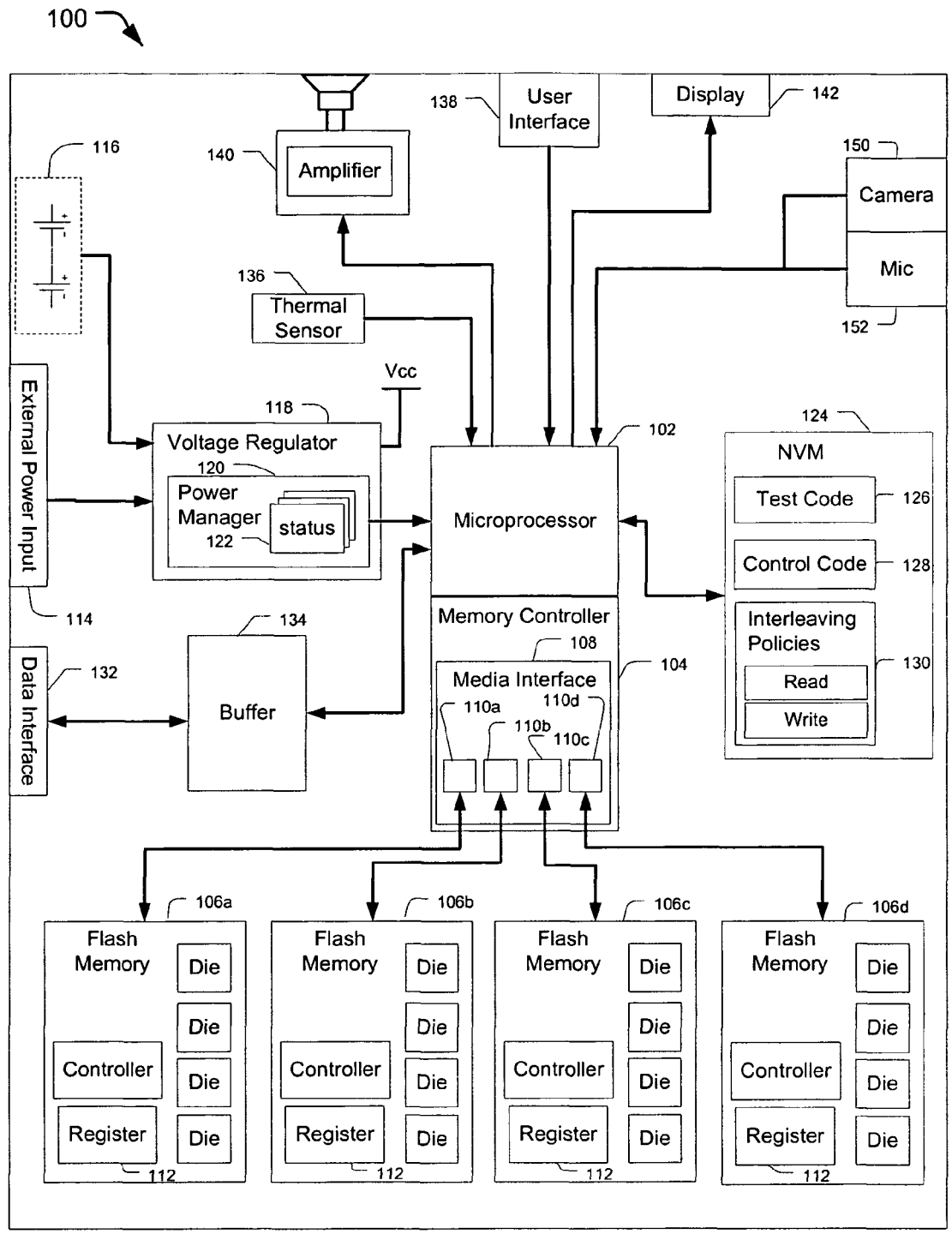
FIG. 1 is a block diagram showing an example of a system including flash memory.

FIG. 1 shows an example of a system 100 capable of storing and retrieving data using flash memory. The system 100 may be, for example, a handheld portable device, such as an MP3 player, cell phone, PDA (portable digital assistant), global positioning system, portable processing device, portable audio/visual recording device, portable video player, or the like. The system 100 is capable of using and/or selecting an appropriate interleaving policy for read operations and an appropriate interleaving policy for write operations. In some implementations, the selected read interleaving policy may be different from the selected read interleaving policy. In some implementations, the read and write interleaving policies may be selected dynamically and/or independently of each other.

The system 100 includes a microprocessor 102, a memory controller 104, and one or more flash memories 106*a*, 106*b*, 106*c*, 106*d*. The microprocessor 102 may perform read or write operations after selecting a read or write interleaving policy. For example, the microprocessor 102 can initiate a read from flash memory 106*a*, 106*b*, 106*c*, 106*d* by sending the selected read interleaving policy and the read command to the memory controller 104. The memory controller 104 then executes the read command according to the selected read interleaving policy. The microprocessor 102 can initiate a write to flash memory by sending the selected write interleaving policy and the write command to the memory controller 104. The memory controller 104 then executes the write command according to the selected write interleaving policy. The system 100 may be configured to select interleaving policies that are appropriate for current operating conditions, such as, power source, battery voltage, temperature, and/or operating mode, for example.

The selected read and/or write interleaving policies determine the number of simultaneous accesses to the flash memories 106a, 106b, 106c, and 106d. By using interleaving, the memory controller 104 may simultaneously read or write data interleaved across multiple memory devices. The interleaving policy can be defined to select an interleaving ratio that is appropriate for the operating conditions. For example, an interleaving ratio of 4:1 may correspond to the system 100 writing four words of data into the memory in a single operation, i.e., with each word being written to a different location in the flash memories 106a-106d at the same time. An interleaving ratio of 2:1 may correspond to the system 100 writing four words of data into the memory using two operations, with two words being written at the same time. An interleaving ratio of 1:1 may correspond to the system 100 writing four words of data into the memory using four operations, with one word being written at a time.

Higher interleaving ratios may take less time to read or write data to the flash memory, but the peak current associated with the memory operation may be higher. Lower interleaving ratios may take longer time to read or write data to the flash memory, but the peak current associated with the memory operation may be lower. In some operating conditions, the system 100 may be configured to limit or minimize either peak current or minimum memory access time. For example, the system 100 may be configured to select a lower interleaving ratio for read operations if the battery voltage drops below a threshold.

When the memory controller 104 receives a read command or a write command, it will execute the command according to the read or write interleaving policy selected by the microprocessor. In some implementations, the microprocessor 102 and the memory controller 104 may be separate devices (e.g., independent integrated circuits). In other implementations, the microprocessor 102 and the memory controller 104 may be integrated into a single device (e.g., ASIC, microcontroller). In this example, the memory controller 104 includes a media interface 108. The media interface 108 includes four registers 110a, 110b, 110c, and 110d. Each of the four registers 110a-110d may temporarily store a word (or byte, long word, quad word etc.) of data to be sent to or received from the flash memories 106a-106d, respectively.

In one example, the system 100 may select and use interleaving policies for read and write commands as follows. The microprocessor 102 may initiate a write command followed by a read command. The write command may involve writing four words of data to four locations in the four flash memories 106a, 106b, 106c, 106d, and the read command may involve reading four words of data from four locations in the four flash memories 106a, 106b, 106c, 106d. The microprocessor 102 first sends the write command and a selected write interleaving policy to the memory controller 104. In this example, the selected write interleaving policy may be 4:1. To complete the execution of the write command, the memory controller 104 then may write the data stored in the registers 110a, 110b, 110c, 110d to the flash memories 106a, 106b, 106c, 106d simultaneously.

After the write command is completed, the microprocessor 102 may send the read command and a selected read interleaving policy to the memory controller 104. In this example, the selected read interleaving policy may be 1:1. To complete the execution of the read command, the memory controller 104 may read the data stored in the registers 110a, 110b, 110c, 110d from the flash memories 106a, 106b, 106c, 106d using four memory operations, one at a time. For example, the memory controller 104 may first transfer the data stored in the flash memory 106a to the register 110a. Then, the memory controller 104 may transfer the data stored in the flash memory 106b to the register 110b. After that, the memory controller 104 may send the data stored in the flash memory 106c to the register 110c. Finally, the memory controller 104 may transfer the data stored in the flash memory 106d from the register 110d.

In this example, each flash memory 106a, 106b, 106c, 106d includes four flash memory die, a controller, and a register 112. The register 112 may store the minimum operating voltage of each flash memory 106a-106d. The minimum operating voltage of each flash memory 106a-106d may affect the selection of interleaving policy. For example, if the battery voltage is lower than a threshold margin above the minimum operating voltage of each flash memory 106a-106d during a write operation, the microprocessor may select a write interleaving policy that has a high interleaving ratio. The threshold margin information for write operations may be stored in the NVM 124 in association with the write interleaving policy 130, and threshold margin information for read operations may be stored in the NVM 124 in association with the read interleaving policy 130.

In an illustrative example, a minimum operating voltage may be 3.1 Volts, and voltage margin may be set at 0.5 Volts (putting the threshold at 3.6 Volts) for the write interleaving policy, and set at 0.2 Volts (putting the threshold at 3.3 Volts) for the read interleaving policy. The microprocessor 102 may reduce the write interleaving ratio from 2:1 to 1:1 when the battery voltage falls below 3.6 Volts. The microprocessor 102 may reduce the read interleaving ratio from 4:1 to 2:1 when the battery voltage falls below 3.3 Volts. These values are merely for illustration, and not to limit the range of battery voltages. Hysteresis bands may be applied to the voltage thresholds in some implementations.

Electrical power of the system 100 may be provided by an external power input 114 or by a battery 116. The external power input 114 and the battery 116 deliver power to a voltage regulator 118. The voltage regulator 118, which may include a linear regulator, a switch-mode DC-to-DC converter, and/or a low drop-out regulator (not shown), includes a power manager 120 that store a list of electrical status 122 of the system 100. Monitored status information may include, for example, whether the external power input 114 is connected to a power source, whether a battery is present, and battery voltage information. In some implementations, the microprocessor 102 may select an interleaving policy depending on the electrical status 122. For example, the microprocessor 102 may be configured to select interleaving policies with the maximum interleaving ratio when the system 100 is connected to an external power source to reduce memory access time, thereby allowing relatively high peak current.

The microprocessor 102 may communicate with a non-volatile memory 124. The non-volatile memory (NVM) 124 stores a test code 126, a control code 128, and interleaving policies 130, including a read interleaving policy and a write interleaving policy. The microprocessor 102 executes the test code 126 to check various conditions in the system 100. The test code 126 may include code that checks power source, battery voltage, temperature, and/or operating mode, for example. The microprocessor 102 then executes the control code 128. The control code 128 may include rules for selecting a read interleaving policy and a write interleaving policy. After selection, the microprocessor 102 can store the selected interleaving policies in the NVM 124. The interleaving policy information 130 may include the currently selected read interleaving policy and the currently selected write interleaving policy.

The microprocessor 102 can send or receive data through a data interface 132 to an external device. Data being transferred between the data interface 132 and the microprocessor 102 may be stored temporarily in a buffer 134.

The operating mode of the data interface 132 may affect the selection of the interleaving policy. For example, if the data interface 132 is receiving data from an external source, the microprocessor 102 may select a read interleaving policy with a higher interleaving ratio. If the system 100 is operating as a portable device receiving data for flash memory, then the microprocessor 102 may select a write interleaving policy with a lower interleaving ratio.

The system 100 may also monitor current operating conditions. For example, the system 100 includes a thermal sensor 136 to measure the temperature in the system 100. The microprocessor 102 may select a lower interleaving policy if the temperature of the system 100 is above a selected threshold temperature, for example.

The system 100 also includes a user interface 138, an audio output device 140, and a display 142. Users can provide instructions to the system 100 using the user interface 138, such as a touch pad, a keyboard, or an Apple Click Wheel™ input (commercially available from Apple Computer, Inc.), for example. A user selected interleaving policy may be based, at least in part, on user input. For example, the user may select a battery conservation mode that is designed to maximize battery life. Increasing battery life may suggest, for example, a lower interleaving ratio for read and/or write interleaving policies. In another example, the user may select a minimum delay mode that is designed to minimize time for memory access operations. Reducing memory access time may suggest, for example, a higher interleaving ratio for the read interleaving policy.

In some implementations, such user-selected inputs may be overridden. For example, when an external power is connected to the external power input 114, the microprocessor 102 may select the maximum achievable interleaving ratio, for example, even if the user has selected the maximize battery life mode. In another example, when the temperature of the system 100 exceeds a preset threshold, the microprocessor 102 may select the minimum achievable interleaving ratio, for example, even if the user has selected the minimum delay time mode and an external power source is connected to the external power input 114.

The audio output device 140 may be, in various implementations, an internal speaker, buzzer, and/or other audible indicator. In some implementations, the amplifier may be coupled to an output connector adapted to provide signals containing audio information to one or more sets of headphones or external speakers (which may be externally amplified). Some implementations may provide either a wired or wireless (e.g., Bluetooth or other RF) interface between the system 100 and an external audio transducer device.

In some implementations, the display 142 may be an LCD or a TFT display, for example, that provides a text-based and/or graphical interface to users. The brightness and/or intensity of the display 142 may be adjustable. In some implementations, the microprocessor 102 may select a lower interleaving policy when the display 142 is operating with high brightness and/or intensity to preserve battery life.

The system 100 also includes a camera 150 and a microphone 152 for providing image and audio information, respectively, to the microprocessor 102. In some implementations, the audio and/or video information may be encoded into a standard format, such as MPEG, JPEG, .wav, bitmap, or other widely adopted data format. The camera 150 may be configured, for example, to capture still and/or moving image (e.g., frames) information, which may be compressed and/or encoded using techniques known by those of ordinary skill in the art of image compression. The microphone 152 may be operated to capture audio information that may or may not be synchronized with image information. The audio and/or image information received from the camera 150 and microphone 152 may be stored in the flash memories 106a-106d according to a write interleaving policy.

For example, in an operating mode in which the camera 150 and/or the microphone 152 are streaming data and the system is being powered by the battery, the microprocessor 102 may select a write interleaving policy with a sufficient interleaving ratio to handle the maximum data rates. In one example, a sufficient interleaving ratio may be 4:1 for combined audio and video information, 2:1 for video information alone, and 1:1 for still image or audio information.

For another example, in an operating mode in which in which the system 100 is operating from the battery 116 while reading from the flash 106a-106d, the microprocessor 102 may select a lower read interleaving policy to maximize battery life. This operating mode may occur, for example, when used as a portable device to play back video, audio, and/or other (e.g., text) information that is stored in the flash memories 106a-106d.

As a further example, in an operating mode in which the system 100 is being powered by an external power source while reading from or writing to the flash 106a-106d, the microprocessor 102 may select a read and/or write interleaving policy to minimize access times. In one application, data (e.g., songs, videos) may be transferred to or from the flash 106a-106d at a maximum achievable data rate to minimize the time required to complete the transfer operation.

Alternatively, reading and writing interleaving policies may be independently determined, stored, or otherwise preset without provision for dynamic adjustment according to battery voltage, temperature, or operating mode.

The microprocessor 102 may execute a program of instructions, such as the test code 126 or the control code 128, according to various methods, examples of which are described with reference to FIGS. 2-3, respectively.

Figure 2:
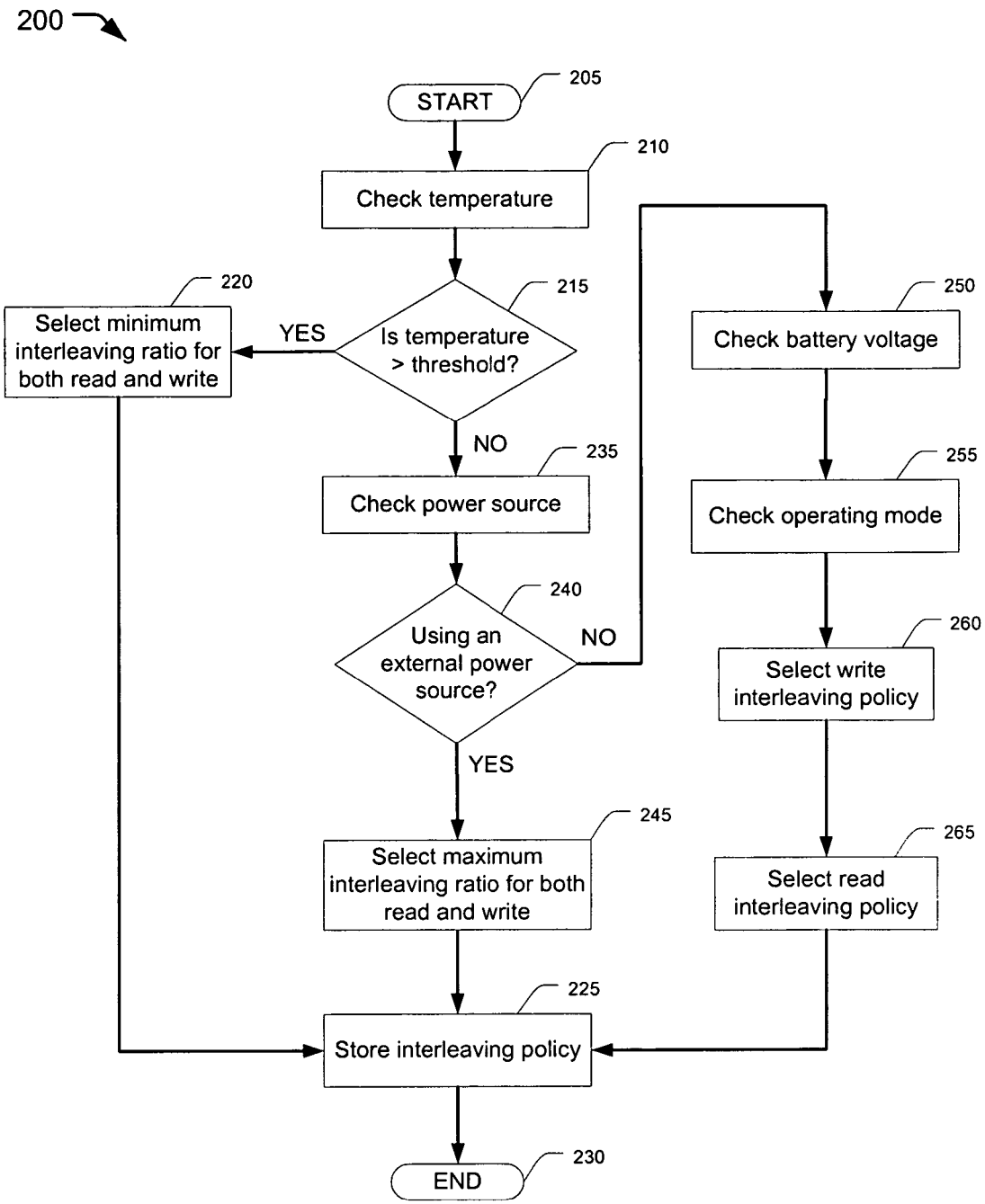
FIG. 2 is a flow diagram illustrating a method for selecting read and write interleaving policies in the system of FIG. 1.

In FIG. 2, a flowchart 200 illustrates an example of operations that the microprocessor 102 may perform when executing implementations of the test code 126. Although the example illustrated in FIG. 1 shows a single block of the test code 126 stored in the NVM 124 for execution by the microprocessor 102, other processors or logic may perform some or all of the operations, and may use instructions that are stored in locations other than in the NVM 124, such as in a RAM (not shown).

In this example, the method begins at step 205 when the microprocessor 102 requests an update of the interleaving policies 130. The conditions that may cause the microprocessor to initiate an update of the interleaving policies 130 will be described in further detail with reference to FIG. 3.

The microprocessor 102 checks the temperature at step 210 by polling or otherwise reading the thermal sensor 136. If the temperature is above a preset threshold temperature at step 215, then the microprocessor 102 selects an interleaving policy for both reading and writing with a minimum interleaving ratio, such as 1:1, for example, at step 220. Next, the microprocessor 102 stores, at step 225, the selected read and write interleaving policies 130 in the NVM 124, and the method ends at step 230.

If, at step 215, the temperature is not above a preset threshold temperature, then the microprocessor 102 checks the power source at step 235. If the system 100 is using an external power source at step 240, then the microprocessor 102 selects an interleaving policy for both reading and writing with a maximum interleaving ratio, such as 4:1, for example, at step 245. Next, the microprocessor 102 stores, at step 225, the selected read and write interleaving policies 130 in the NVM 124, and the method ends at step 230.

At step 240, if the system 100 is using the battery 116 as the power source, then the microprocessor 102 checks the battery voltage in step 250 by reading the status register 122 of the power manager 120 in the voltage regulator 118. Next, the microprocessor 102 checks, at step 255, the operating mode of the system 100. The operating mode may include, for example, the operations that the system 100 is currently performing and the user-selected operating mode, such as the maximum battery life mode, or the minimum delay mode. As another example, the microprocessor 102 may check the data flow in the data interface 132, the operating condition of the display 142, and the output in the audio output device 140. If these devices are drawing a large amount of current, the microprocessor 102 may select an interleaving policy with low interleaving ratio. After the battery voltage and the operating mode are checked, the microprocessor 102 independently selects a write interleaving policy in step 260 and a read interleaving policy in step 265. Next, the microprocessor 102 stores, at step 225, the selected read and write interleaving policies 130 in the NVM 124, and the method ends at step 230.

Figure 3:
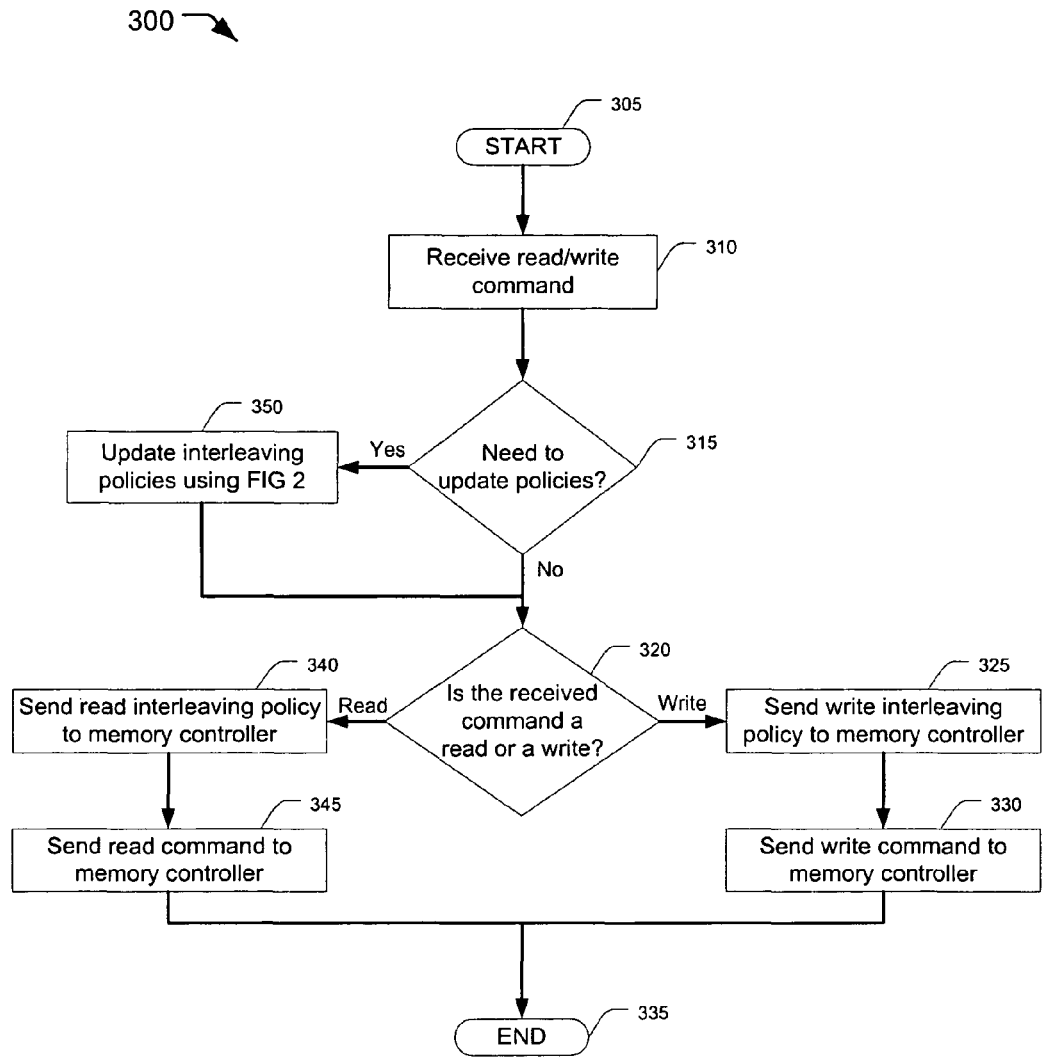
FIG. 3 is a flow diagram illustrating a method for applying a selected interleaving policy when a memory access operation is requested.

In FIG. 3, a flowchart 300 illustrates an example of operations that the microprocessor 102 may perform when executing implementations of the control code 128. The microprocessor 102 may execute the control code 128 to select an appropriate interleaving policy and to send the selected interleaving policy to the memory controller 104. In this example, the method begins at step 305 when the microprocessor 102 receives a command to access the flash memories 106a-106d. In step 310, the microprocessor 102 receives a write or a read command. For example, the microprocessor 102 may receive a write command when a user downloads data into the flash memories 106a-106d through the data interface 132. As another example, the microprocessor 102 may receive a read command when a user uses the user interface 138 to instruct the system 100 to play video stored in the flash memories 106a-106d.

The microprocessor 102 then, in step 315, determines whether there is a need to update the interleaving policies. If the microprocessor 102 determines that there is a need to update the interleaving policies, then, at step 350, the microprocessor 102 executes the test code 126 to select and to store interleaving policies, as illustrated in the flowchart 200. For example, the interleaving policies may need to be changed when any of the temperature, the power source, the battery voltage, and/or the operating mode, is changed. In another example, the interleaving policies may be updated periodically according to a schedule (e.g., hourly, daily, weekly, etc . . . ).

If the microprocessor 102 determines, at step 315, that there is no need to update the interleaving policies, then the microprocessor 102 checks whether the command is a read command or a write command in step 320. If the received command is a write command, then the microprocessor 102 sends the write interleaving policy in step 325 to the memory controller 104. Next, in step 330, the microprocessor 102 sends the write command to the memory controller 104 and the method ends in step 335.

In step 320, if the command is a read command, then the microprocessor 102 sends the read interleaving policy in step 340 to the memory controller 104. Next, in step 345, the microprocessor 102 sends the read command to the memory controller 104 and the method ends in step 335.

After the microprocessor 102 has selected and stored interleaving policies, the process returns to step 320.

Although one implementation of the method has been described, other implementations may perform the steps in different sequence, or a modified arrangement to achieve the same primary function, which is to select appropriate interleaving policies for reading and for writing flash memory.

Although an example of a system, which may be portable, has been described with reference to FIG. 1, other implementations may be deployed in other processing applications, such as desktop and networked environments.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A system for processing data using interleaved memory, the system comprising:
    a plurality of memory elements;
    a memory controller adapted to selectively control an interleaving ratio for concurrently accessing the plurality of memory elements, wherein the interleaving ratio defines a number of the plurality of memory elements concurrently accessed, and wherein accessing the plurality of memory elements is selected from the group consisting of reading from the plurality of flash memory elements and writing to the plurality of flash memory elements; and,
    a processor adapted to receive instructions that, when executed, cause the processor to perform operations including:
        receiving a request to access the memory elements, wherein the request to access the memory elements includes a request to read from a plurality of memory cells included in the memory elements, wherein the plurality of memory cells store data written using a selected write interleaving ratio;
        identifying a type of a power source operatively coupled to the plurality of memory elements for use in accessing the plurality of memory elements;
        selecting a first interleaving ratio at which to perform the read request for the plurality of memory cells if the power source is identified as a first type of power source;
        selecting a second interleaving ratio, different from the first interleaving ratio, at which to perform the read request for the plurality of memory cells if the power source is identified as a second type of power source, wherein the second interleaving ratio for reading from the plurality of memory cells is selected independently of the selected write interleaving ratio used to write the data to the plurality of memory cells; and
        identifying the selected interleaving ratio to the memory controller.

2. The system of claim 1, wherein the plurality of memory elements comprise flash memory.

3. The system of claim 1, wherein the second power source comprises a portable stored energy source.

4. The system of claim 3, wherein selecting the second interleaving ratio includes selecting an interleaving ratio that is less than a maximum available interleaving ratio.

5. A method of selecting an interleaving policy for accessing a flash memory configured to store interleaved data, the method comprising:
    receiving a request to write to plurality of memory cells of a flash memory, wherein the flash memory includes a plurality of memory elements and the flash memory is configured to selectively access the plurality of memory elements according to an interleaving ratio defining a number of concurrent accesses to the plurality of memory elements;
    identifying a particular set of operating conditions relating to the flash memory, wherein the particular set of operating conditions include at least one of a temperature, a type of power source, or an operating mode, and wherein the operating mode is selected from the group consisting of: operating using an external power source; and operating using a portable power source;
    identifying a write interleaving ratio for writing to the plurality of memory cells of the flash memory based on an application of a first set of criteria for the identified particular set of operating conditions;
    writing to the plurality of memory cells using the identified write interleaving ratio;
    receiving a request to read from the plurality of memory cells of the flash memory; and
    identifying a read interleaving ratio for reading from the plurality of memory cells of the flash memory based on an application of a second set of criteria for the identified particular set of operating conditions, wherein the read interleaving ratio for reading from the plurality of memory cells is identified independently of, and differs from, the write interleaving ratio used to write to the plurality of memory cells.

6. The method of claim 5, wherein the second set of criteria includes a criterion relating to at least one of a power supply voltage or a current available to supply power to the flash memory.

7. The method of claim 5, wherein the identified read interleaving ratio is selected based on the application of the second set of criteria to be greater than a minimum available read interleaving ratio when a power supply voltage or current available to supply power to the flash memory exceeds a first threshold.

8. The method of claim 7, wherein the identified write interleaving ratio is selected based on the application of the first set of criteria to be greater than a minimum available write interleaving ratio when the power supply voltage or current available to supply power to the flash memory exceeds a second threshold, and wherein the second threshold is substantially different than the first threshold.

9. The method of claim 5, wherein the identified read interleaving ratio is selected based on the application of the second set of criteria to be a maximum available read interleaving ratio unless the flash memory is operated using power being drawn from a portable source of stored energy.

10. The method of claim 5, wherein the identified write interleaving ratio is selected based on the application of the first set of criteria as being a fixed interleaving ratio.

11. The method of claim 5, wherein the identified write interleaving ratio is selected according to the application of the first set of criteria based on a data transfer rate associated with data to be written to the flash memory.

12. The method of claim 11, wherein the write interleaving ratio comprises a ratio sufficient to write the data to the flash memory at the data transfer rate.

13. The method of claim 12, wherein the identified write interleaving ratio is selected based on the application of the first set of criteria as being higher for data streams including video and audio information than for data streams including audio information without video information.

14. The method of claim 12, wherein the identified write interleaving ratio is selected based on the application of the first set of criteria as being higher for data streams comprising video information than for data streams comprising still image information.

15. The method of claim 5, wherein the application of at least one of the first set of criteria or the second set of criteria results in a reduced write interleaving ratio or a reduced read interleaving ratio, respectively, upon detecting that a temperature exceeds a threshold.

16. The method of claim 5, wherein the application of at least one of the first set of criteria or the second set of criteria results in a reduced write interleaving ratio or a reduced read interleaving ratio, respectively, in response to a signal to minimize power consumption.

17. The method of claim 5, wherein the read interleaving ratio is identified to control a maximum current level drawn to process the read request.

18. The method of claim 5, wherein the write interleaving ratio is identified to control a maximum current level drawn to process the write request.

19. An article of manufacture comprising machine-readable instructions that, when executed by a processor, cause operations to be performed, the operations including:
receiving a request to access memory, wherein the request comprises a request to read from plurality of memory cells in the memory, wherein the plurality of memory cells store data written using a write interleaving policy;
identifying a read interleaving policy for concurrently accessing memory elements in the memory to perform the read request based on a first set of criteria, wherein the read interleaving policy for reading from the plurality of memory cells is identified independently of, and differs from, the write interleaving policy used to write the data to the plurality of memory cells, the first set of criteria including at least one criterion that differs in at least one operating condition from criteria used to select the write interleaving policy, wherein the first set of criteria includes one or more members of the group consisting of: a temperature; and a type of power source; wherein operating conditions include at least one of a temperature, a type of power source, an operating mode, and wherein the operating mode is selected from the group consisting of operating using an external power source and operating using a portable power source; and
sending a signal to perform the requested memory access using the identified interleaving policy.

20. The article of claim 19, wherein the write interleaving policy is identified based on a second set of criteria, wherein the second set of criteria includes one or more members of the group consisting of: a temperature; an operating mode; and a data transfer rate; a power source.

21. The article of claim 19, the operations further comprising accessing a plurality of flash memory blocks using the identified read interleaving policy.

22. The article of claim 19, the operations further comprising updating the read interleaving policy.

23. The article of claim 22, wherein updating the read interleaving policy includes identifying a change in at least one parameter selected from the group consisting of: temperature, a type of power source, and operating mode.

24. The article of claim 19, further comprising reducing a read interleaving ratio defined by the read interleaving upon detecting that a temperature exceeds a predetermined threshold.

* * * * *